July 29, 1958 — P. D. WEST — 2,844,852
TRUSS
Filed Aug. 19, 1957
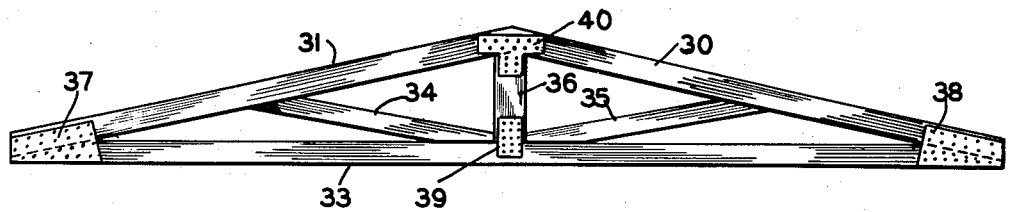
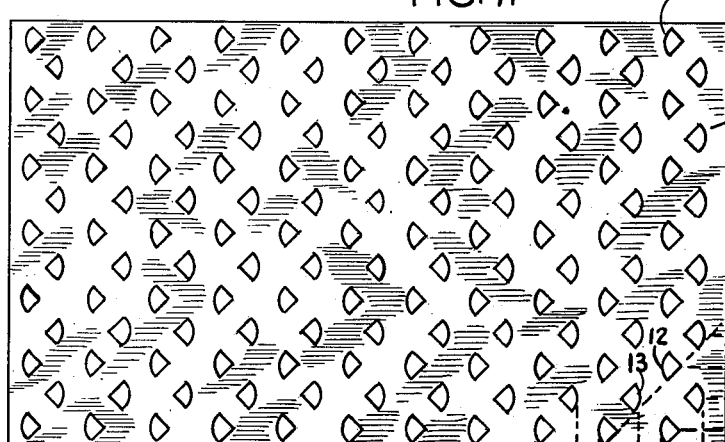
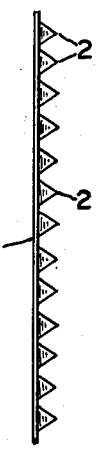
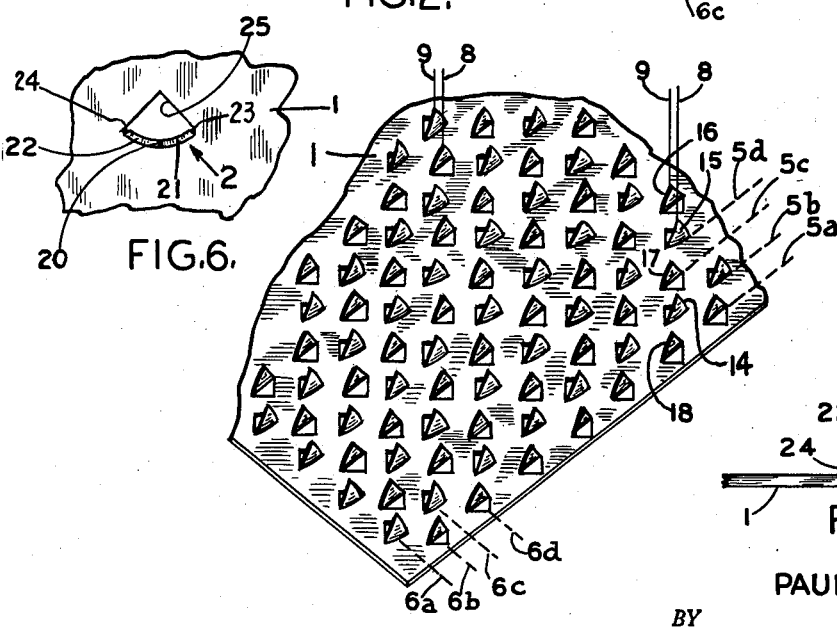
INVENTOR.
PAUL D. WEST
BY
ATTORNEYS United States Patent Office 2,844,852
Patented July 29, 1958

2,844,852

TRUSS

Paul D. West, Colorado Springs, Colo.

Application August 19, 1957, Serial No. 678,775

5 Claims. (Cl. 20—92)

This invention relates to connector plates for wooden structure members and particularly to metal connector or gusset plates having a plurality of integral punched out teeth arranged to be impressed into the wooden structure to securely hold juxtaposed members of the wooden structure together.

Included among the objects and advantages of the present invention is a connector plate for wooden structures which provides a positive mechanical connection between adjoining structure members in the same plane, which connection is strong, resisting forces of tension and compression. The use of the plate provides for a lighter weight truss than with ordinary construction, thereby reducing the waste of lumber and obtaining the ultimate strength of the wooden members. The connector plate may be utilized with wooden structures lying in the same plane, to connect adjoining members, making a strong joint between the wooden members. The plate of the invention provides a plurality of teeth or prongs which are pressed into the wood of the adjoining members, and the teeth or prongs are arranged in alinement in lateral and perpendicularly transverse rows of teeth, but adjacent teeth on diagonal lines are arranged out of alinement to reduce the tearing of the wood fibres and splitting of the wood when the connector plate is pressed into the wood.

These and other objects and advantages of the invention may be readily ascertained by referring to the following description and appended illustrations in which:

Fig. 1 is a top plan view of the plate according to the invention, illustrating the positioning of holes resulting from the punched out teeth or prongs;

Fig. 2 is a side elevational view of the plate of Fig. 1;

Fig. 3 is another side elevational view showing the transverse alinement of the teeth;

Fig. 4 is a partial, perspective view of a portion of the plate, illustrating the alinement of the teeth along lateral, transverse and diagonal lines;

Fig. 5 is an enlarged detail view of a tooth punched from a plate according to the invention;

Fig. 6 is a top plan view enlarged detail of a tooth; and

Fig. 7 is a side elevational view of a roof truss made of wooden members utilizing the connector plate of the invention.

In general, the connector plates or gussets are metal plates of about 20 gauge, and preferably galvanized steel plates, having a plurality of generally triangular teeth punched from the plates and extending unidirectionally at substantially right angles thereto. Half of the teeth in the plate face in one direction and the other half of the teeth face in the opposite direction, as described below. The positioning of the teeth is such that alternate rows of teeth face in opposite directions. The teeth are positioned so as to aline laterally and transversely, but on diagonal lines adjacent teeth are offset from each other. In other words, the teeth are arranged in alinement on transverse and longitudinal directions and four adjacent teeth form a generally diamond pattern. The configuration of the plate may be generally rectangular, but the shape, however, may be made in any shape to fit the particular use.

The device illustrated in Figs. 1 through 5 includes a rectangular metal plate 1 having a plurality of teeth 2 punched unidirectionally therefrom, with all of the teeth extending substantially perpendicular thereto. In a very useful form, the plate is a 20 gauge galvanized steel plate, which may be of a size and shape to fit the particular application. The teeth 2 are punched out of the plate along longitudinal lines 5a, 5b, 5c, 5d, etc. evenly spaced across the plate. The longitudinal lines 5a, 5b, 5c, etc. are taken along the points of the teeth, and the lines through the teeth points are spaced more than one tooth width apart. The teeth are positioned along transverse lines 6a, 6b, 6c, 6d, etc., taken through the points of the teeth, which are parallel and spaced more than a tooth width apart. In each case, alternate rows along longitudinal lines and alternate rows along the transverse lines, the teeth are facing in opposite directions. In each individual row, however, the teeth all face in the same direction, for example, in row 5a the teeth are facing to the right, in 5b, all the teeth are facing to the left, etc., and similarly the teeth in line 6a are facing to the left and the ones along the line 6b are facing to the right. This configuration provides a diamond shape for any four adjacent teeth, where two teeth face in one direction and the other two face in the opposite direction, for example, teeth 10, 11, 12 and 13 in the lower right hand corner of the plate. Alternate teeth along any diagonal line, for example, diagonal line 7, face in alternate directions. Along an average diagonal line through the teeth, however, the points of alternate teeth are offset a distance apart, illustrated in Fig. 4 where an average diagonal line 8 extends substantially through the points of teeth 14 and 15 while an average diagonal line 9 extends substantially through the points of teeth 16, 17 and 18. The distance between lines 8 and 9 that the teeth are offset prevents adjacent teeth from entering the same fibre of the wood when the teeth are mounted through diagonally abutting sections. In actual construction, the teeth are all slightly offset, i. e., the points of teeth 16, 17 and 18 are slightly offset and diagonal line 9 is merely an average. The particular configuration of the placement of the teeth provides maximum strength of the plate since no tooth is closer to its neighboring tooth than a full tooth width.

The teeth illustrated in detail in Figs. 5 and 6 are generally triangular in planar configuration, but in lateral configuration the tooth is curved to provide maximum strength of the projecting teeth. The teeth include a point 20, diagonal sides 21 and 22, and short insets 23 and 24 at the base of the triangular shaped member. After the teeth are punched from the plate, a pie-shaped opening 25 results with the tooth 2 extending upwardly from the arcuate portion of the pie-shaped opening. The thickness of the tooth 2 is determined by the thickness of the plate, and the arcuate configuration of the upstanding tooth provides maximum strength of the tooth for driving into wooden members.

The connector plates or gussets are used to connect timbers or wooden structure members into trusses and the like, securing the joints of single plane wooden truss members. Such a truss is illustrated in Fig. 7 where the truss members 30 and 31 are joined to a cord member 33. Lateral braces 34, 35 and upright brace 36 complete the truss member. A trapezoidal connector plate or gusset 37 secures the outer ends of truss member or web 31 with the outer end of the cord member 33. In a similar manner, a trapezoidal gusset 38, which is a mirror image of the plate 37, secures the outer end of the web 30 with the end of the cord 33. A rectangular gusset 39 secures the upright 36 with the cord 33 and the inner ends of the webs 31. A T-shaped gusset 40 is utilized to connect the inner ends of the webs together with the upright 36. This provides a single plane construction where all the truss members lie in a single plane, and for added strength a similar gusset is placed on the opposite side of each joint.

The gussets are pressed into both faces of the joints of the truss members by means of a mechanical or hydraulic press, not shown, and prior to the pressing operation, the gussets are placed in position and nailed to the adjoining members using tight gripping nails, or other hard setting nails. When the pressure of the press presses the gusset members into the wood, the nails are further pressed further into the wood. The nails merely hold the gussets in place and do not add appreciably to the strength of the joint. The teeth of the gussets are pressed into the wood fibres and in the preferred form, the flat plate sections of the gusset lie tightly on the surface of the wooden member. The nails are driven through the openings in the plate where the teeth have been punched, and sufficient nails must be provided to securely hold the gusset in place.

Under the normal use of the gussets or connector plates, the connection between the wooden members may not be on perpendicular lines, that is, the wood fibers of adjacent members are rarely perpendicular to each other. The placement of the teeth in the plate to provide an offset distance between adjacent teeth along diagonal lines, prevents the teeth from being normally placed into the same wooden fibre or grain, and since along the diagonal lines the teeth are set apart more than a full tooth width, the offsetting prevents splitting of the wood. The gussets or connector plates may be utilized wherever timbers or wooden members are connected in abutting relation. The plate eliminates the use of long nails driven through one member into the other and provides a stronger joint than when the members have merely nailed joints or wooden gussets which are nailed over the joint.

While the invention has been illustrated by reference to a specific embodiment, there is no intent to limit the spirit or scope of the invention to the precise details set forth, but obvious equivalents and changes which occur to those skilled in the art are intended to be included.

I claim:

1. A connector plate or gusset for securing abutting wooden structure members together comprising a relatively thin metal sheet having a series of teeth punched therefrom and extending unidirectionally from said plate, said teeth being generally triangular in planar arrangement and each extending outwardly to a sharpened apex, said teeth being curved in profile, said teeth being arranged generally in rows, said rows of teeth being alined along parallel, perpendicular, and diagonal lines, alternate rows of teeth along the parallel and perpendicular lines extending in the same direction, said teeth being arranged so that alternate teeth along each diagonal line face in opposite directions and alternate rows of parallel and alternate rows of perpendicular teeth face in a direction opposite to the other rows, and said teeth being arranged so that the points of adjacent teeth along diagonal lines are offset one from the other.

2. A connector plate or gusset for securing abutting wooden structure members together comprising a relatively thin metal sheet having a series of teeth punched therefrom and extending unidirectionally from said plate, said teeth being generally triangular in planar arrangement and each extending outwardly to a sharpened apex, said teeth being concavely curved toward its vacated hole in profile, said teeth being arranged in rows, said rows of teeth being alined along parallel, perpendicular, and diagonal lines, alternate rows of teeth along the parallel and perpendicular lines extending in the same direction, said teeth being arranged so that alternate teeth along diagonal lines and alternate rows of parallel and alternate rows of perpendicular teeth are facing in opposite directions, and said teeth being arranged so that the points of adjacent teeth along diagonal lines are offset one from the other.

3. A connector plate or gusset according to claim 2, in which each tooth is spaced from all neighboring teeth at least a full tooth width apart.

4. A connector plate of the class described comprising a relatively thin metal plate, a plurality of teeth punched from and depending perpendicularly and unidirectionally from said plate, said teeth being alined in longitudinal and transverse rows along said plate, the teeth in adjacent longitudinal transverse rows being faced in opposite directions and teeth in adjacent transverse lines being faced in opposite directions, the distance between adjacent teeth being greater than one tooth width, the adjacent teeth along diagonal lines being staggered one from the other, the adjacent teeth along diagonal lines being spaced substantially more than a tooth width apart, and said teeth being generally triangular from base to apex and curved in profile.

5. A connector plate according to claim 4, in which all longitudinal rows are parallel and all transverse rows are parallel, said transverse rows being perpendicular to said longitudinal rows.

No references cited.